(12) United States Patent
Hata

(10) Patent No.: US 12,333,194 B2
(45) Date of Patent: Jun. 17, 2025

(54) PRINTING APPARATUS, INFORMATION PROCESSING APPARATUS, METHOD OF CONTROLLING PRINTING APPARATUS, METHOD OF CONTROLLING INFORMATION PROCESSING APPARATUS, PRINTING SYSTEM, AND STORAGE MEDIUM

(71) Applicant: CANON KABUSHIKI KAISHA, Tokyo (JP)

(72) Inventor: Kazuhiro Hata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 18/222,052

(22) Filed: Jul. 14, 2023

(65) Prior Publication Data

US 2024/0069826 A1    Feb. 29, 2024

(30) Foreign Application Priority Data

Aug. 24, 2022  (JP) .................................. 2022-133300

(51) Int. Cl.
  *G06F 3/12*   (2006.01)
  *G06F 9/451*   (2018.01)
(52) U.S. Cl.
  CPC .......... *G06F 3/1229* (2013.01); *G06F 3/1259* (2013.01); *G06F 9/451* (2018.02)
(58) Field of Classification Search
  CPC ....... G06F 3/1229; G06F 3/1259; G06F 9/451
  See application file for complete search history.

(56) References Cited

U.S. PATENT DOCUMENTS

| | | | | |
|---|---|---|---|---|
| 5,557,393 A | * | 9/1996 | Goodman ............ | G03G 9/0975 430/108.4 |
| 10,437,538 B2 | | 10/2019 | Kanamori | |
| 2007/0024689 A1 | * | 2/2007 | Preston .............. | G03G 15/0121 347/111 |
| 2008/0079750 A1 | * | 4/2008 | Setlur ....................... | G06F 3/14 345/593 |
| 2019/0354051 A1 | * | 11/2019 | Ogino .................... | G06F 3/1207 |
| 2020/0097226 A1 | * | 3/2020 | Niiyama ............... | G06F 3/1234 |

(Continued)

FOREIGN PATENT DOCUMENTS

| | | | |
|---|---|---|---|
| JP | 2011203598 A | * | 10/2011 |
| JP | 2019-070926 A | | 5/2019 |

*Primary Examiner* — Daniel W Parcher
(74) *Attorney, Agent, or Firm* — VENABLE LLP

(57) ABSTRACT

A printing apparatus communicates with an information processing apparatus which displays a remaining amount of a first color material and a second color material in the printing apparatus on a display region based on information sent from the printing apparatus. A first color material display color is modified such that a color difference between the first color material display color and a background color of the display region becomes more than or equal to a predetermined value. A modified display color difference between the display color of the second color material and the background color becomes more than or equal to the predetermined value. The information processing apparatus displays the remaining amount of the first and second color materials in the display region using the modified first and second material display colors and the background color.

21 Claims, 17 Drawing Sheets

(56) References Cited

U.S. PATENT DOCUMENTS

| | | | |
|---|---|---|---|
| 2020/0097781 A1* | 3/2020 | Niiyama | G06F 3/1282 |
| 2021/0065604 A1* | 3/2021 | Tsai | G09G 3/2003 |
| 2021/0303954 A1* | 9/2021 | Sato | G06F 3/1203 |
| 2023/0273754 A1* | 8/2023 | Kanzaki | G06K 15/102 |
| | | | 358/1.9 |

* cited by examiner

FIG.3A

```
Get-Printer-Attributes:
    attributes-charset (charset) = utf-8
    attributes-natural-language (naturalLanguage) = en
    printer-uri (uri) = ipp://192.168.114.5:631/ipp/print
    background-color = "#E0E0E0"
    requesting-user-name (nameWithoutLanguage) = user
    requested-attributes (keyword) = all
```

FIG.3B

```
status-code = successful-ok
    attributes-charset (charset) = utf-8
    attributes-natural-language (naturalLanguage) = en
    media-supported (1setOf keyword)=
'na_letter_8.5x11in','na_legal_8.5x14in','na_executive_7.25x10.5in','na_invoice_5.5x8.5in','na_fo
olscap_8.5x13in','na_oficio_8.5x13.4in','na_index-3x5_3x5in','na_index-_4x6_4x6in','na_5x7_5x7in'
    media-type-supported (1setOf keyword)='stationery','stationery-lightweight','stationery-
heavyweight','label','photographic'
    marker-colors (1setOf nameWithutLanguage) = "#E0A1E2", "#D10716", "#00CFFF", "#E0E0E0",
"#0640C4", "#C4C388", "#808080", "#FFDA00"
    marker-high-levels(1setOf integer) = 100,100,100,100,100,100,100,100
    marker-levels(1setOf integer) = 100,100,100,100,100,90,100,100,90
    marker-names(1setOf nameWithutLanguage) = PM,R,C,PGY,GY,Y,M,PC
```

FIG.8A

```
Get-Printer-Attributes:
    attributes-charset (charset) = utf-8
    attributes-natural-language (naturalLanguage) = en
    printer-uri (uri) = ipp://192.168.114.5:631/ipp/print
    requesting-user-name (nameWithoutLanguage) = user
    requested-attributes (keyword) = all
```

FIG.8B

```
    status-code = successful-ok
    attributes-charset (charset) = utf-8
    attributes-natural-language (naturalLanguage) = en
    media-supported (1setOf keyword)=
'na_letter_8.5x11in','na_legal_8.5x14in','na_executive_7.25x10.5in','na_invoice_5.5x8.5in','na_f
oolscap_8.5x13in','na_oficio_8.5x13.4in','na_index-3x5_3x5in','na_index-4x6_4x6in','na_5x7_5x7in'
    media-type-supported (1setOf keyword)='stationery','stationery-lightweight','stationery'
heavyweight','label','photographic'
background-color = "#FFFFFF"
marker-colors (1setOf nameWithoutLanguage) = "#000000", "#000000", "#000000", "#000000",
"#000000", "#000000", "#000000"
marker-high-levels(1setOf integer) = 100,100,100,100,100,100,100,100
marker-levels(1setOf integer) = 100,100,100,100,100,90,100,100,90
marker-names(1setOf nameWithoutLanguage) = PM,R,C,PGY,GY,Y,M,PC
```

| PATTERN | BACKGROUND COLOR | COLOR OF REMAINING AMOUNT BAR INDICATING REMAINING INK AMOUNT |
|---|---|---|
| 1 | #FFFFFF | #000000 |
| 2 | #000000 | #FFFFFF |
| 3 | #E0E0E0 | #E0A1E2 |

FIG.11

```
Get-Printer-Attributes:
    attributes-charset (charset) = utf-8
    attributes-natural-language (naturalLanguage) = en
    printer-uri (uri) = ipp://192.168.114.5:631/ipp/print
    marker-colors-update = ON
    requesting-user-name (nameWithoutLanguage) = user
    requested-attributes (keyword) = all
```

FIG.16A

```
    status-code = successful-ok
    attributes-charset (charset) = utf-8
    attributes-natural-language (naturalLanguage) = en
    media-supported (1setOf keyword)=
'na_letter_8.5x11in','na_legal_8.5x14in','na_executive_7.25x10.5in','na_invoice_5.5x8.5in','na_f
oolscap_8.5x13in','na_oficio_8.5x13.4in','na_index-3x5_3x5in','na_index-
4x6_4x6in','na_5x7_5x7in'
    media-type-supported (1setOf keyword)='stationery','stationery-lightweight','stationery-
heavyweight','label','photographic'
    background-color = "#FFFFFF"
    marker-colors (1setOf nameWithoutLanguage) = "#E0A1E2", "#D10716", "#00CFFF", "#E0E0E0",
"#0640C4", "#C4C388", "#808080", "#FFDA00"
    marker-high-levels(1setOf integer) = 100,100,100,100,100,100,100,100
    marker-levels(1setOf integer) = 100,100,100,100,90,100,100,90
    marker-names(1setOf nameWithutLanguage) = PM,R,C,PGY,GY,Y,M,PC
```

FIG.16B

PRINTING APPARATUS, INFORMATION PROCESSING APPARATUS, METHOD OF CONTROLLING PRINTING APPARATUS, METHOD OF CONTROLLING INFORMATION PROCESSING APPARATUS, PRINTING SYSTEM, AND STORAGE MEDIUM

BACKGROUND OF THE INVENTION

Field of the Invention

The present disclosure relates to a technique for notifying an information processing apparatus of information on the remaining amount of a color material from a printing apparatus.

Description of the Related Art

Apple Inc.'s macOS (registered trademark), Microsoft Corporation's Windows (registered trademark), and the like have been known as operating systems (OSs) installable on personal computers (PCs). OSs have functions of, for example, obtaining statuses of a printing apparatus connected in a wired or wireless fashion and displaying information on the remaining amounts of the inks in the ink tanks mounted on the printing apparatus and the like on a screen by utilizing a predetermined utility and communication protocol. The Internet Printing Protocol (IPP) has been known as a communication protocol for causing printing apparatuses to execute printing. In IPP, a "marker-colors" attribute and a "marker-levels" attribute have been known as parameters in a case of sending ink information of a printing apparatus to a terminal apparatus. The "marker-colors" attribute corresponds to information on the colors of inks. The "marker-levels" attribute corresponds to information on the remaining amounts of inks.

Japanese Patent Laid-Open No. 2019-70926 (hereinafter Document 1) discloses a technique for displaying the remaining amounts of inks in a printing apparatus on a screen of a PC by using information on the remaining ink amounts or the like obtained from the printing apparatus with IPP. In a case of displaying the remaining amounts of inks in a printing apparatus on a display screen of an information processing apparatus, such as a PC, by using IPP as in Document 1, the printing apparatus notifies the information processing apparatus of the colors of the inks and the remaining amounts of the inks. The information processing apparatus then displays the remaining ink amounts in the form of a bar graph with bars in the ink colors based on the notified contents against a background color prepared in advance by the information processing apparatus.

There has been a need to improve the visual recognizability of the remaining amounts of color materials, such as inks, to users.

SUMMARY OF THE INVENTION

A printing apparatus according to an aspect of the present disclosure is a printing apparatus capable of communicating with an information processing apparatus which displays a remaining amount of a color material in the printing apparatus on a display region based on information sent from the printing apparatus, the printing apparatus comprising at least one memory and at least one processor which function as: a reception unit configured to receive an obtaining request to obtain information on the printing apparatus from the information processing apparatus; a control unit configured to control a display color of the color material such that a color difference between the display color of the color material and a background color of the display region becomes more than or equal to a predetermined value; and a sending unit configured to send information on the printing apparatus including the controlled display color and the remaining amount of the color material to the information processing apparatus as a response to the obtaining request.

Further features of the present invention will become apparent from the following description of exemplary embodiments with reference to the attached drawings.

BRIEF DESCRIPTION OF THE DRAWINGS

FIGS. 3A and 3B are diagrams illustrating an example of the contents of IPP communication performed between a terminal apparatus and a printing apparatus;

FIGS. 8A and 8B are diagrams illustrating an example of the contents of IPP communication performed between a terminal apparatus and a printing apparatus;

FIG. 11 is a diagram illustrating an example of a pattern color conversion table;

FIGS. 16A and 16B are diagrams illustrating an example of the contents of IPP communication performed between a terminal apparatus and a printing apparatus.

DESCRIPTION OF THE EMBODIMENTS

Preferred embodiments of the present disclosure will be specifically described with reference to the accompanying drawings. Note that the following embodiment does not limit the contents of the present disclosure, and not all of the combinations of the features described in the following embodiments are necessarily essential for the solution provided by the present disclosure. Incidentally, the same components will be described with the same reference sign given thereto.

First Embodiment

In a first embodiment, a description will exemplarily be given of a configuration in which IPP is used as a communication protocol for causing a printing apparatus to execute printing. Moreover, a description will be given of a configuration in which a "marker-colors" attribute and a "marker-levels" attribute are included as parameters in a case of sending ink information on the printing apparatus to the terminal apparatus in accordance with IPP. The "marker-colors" attribute corresponds to information on display colors of inks. The "marker-levels" attribute corresponds to information on the remaining amounts of the inks. Note that the above is a mere example, and attributes other than the above may be used, or a communication protocol other than IPP may be used. Also, the description will be given with the terminal apparatus as an example of an information processing apparatus capable of communicating with the printing apparatus.

Figure 1:
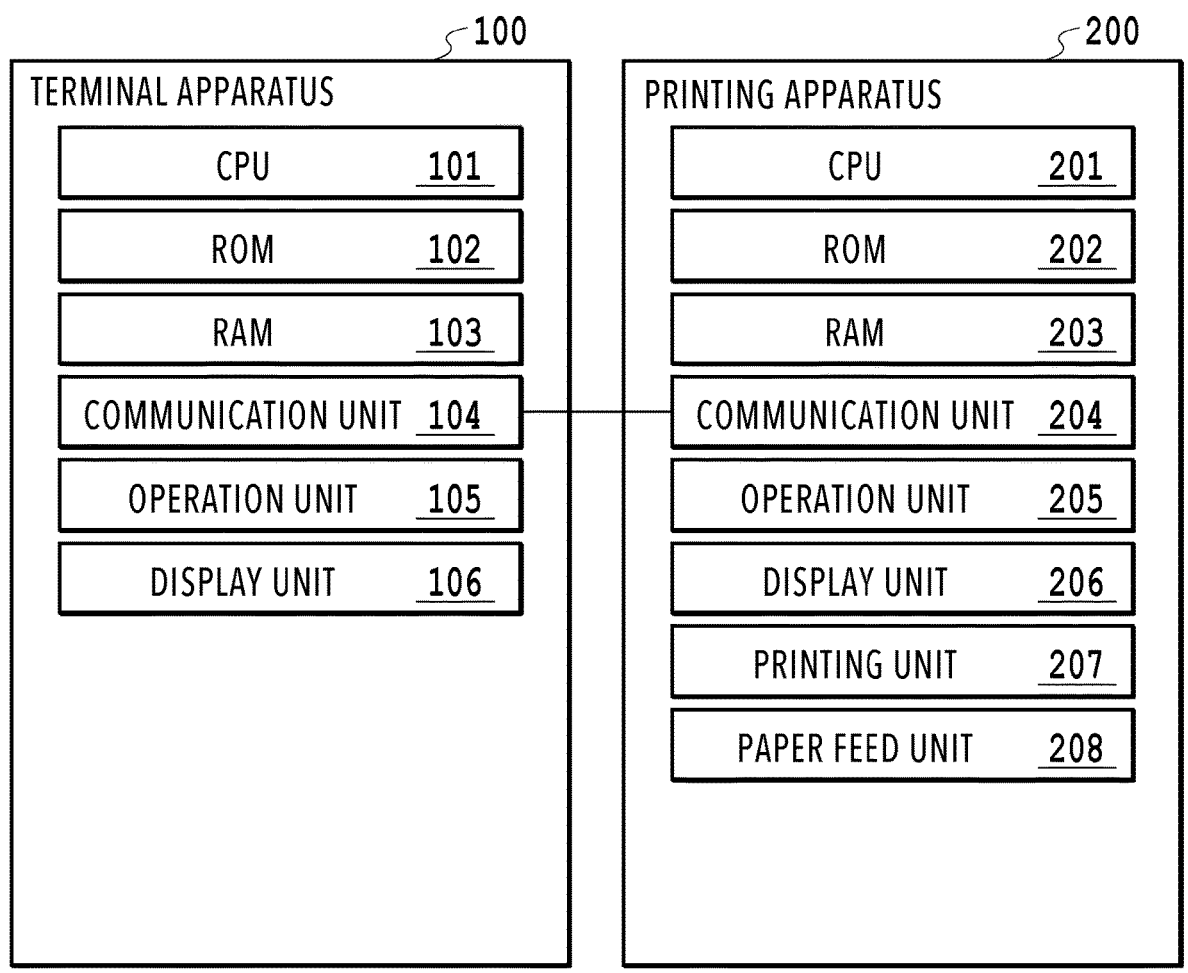
FIG. 1 is a diagram illustrating a configuration of a printing system.

FIG. 1 is a diagram illustrating a configuration of a printing system including a terminal apparatus 100 and a printing apparatus 200 in the present embodiment. The terminal apparatus 100 is an information processing apparatus, examples of which include a smartphone, a personal computer, and the like. The terminal apparatus 100 includes a central processing unit (CPU) 101, a read-only memory (ROM) 102, a random access memory (RAM) 103, a communication unit 104, an operation unit 105, and a display unit 106. The CPU 101 is a central processing unit that executes programs stored in the ROM 102. The ROM 102 is a non-volatile memory that stores data of an operating system, application programs to be used by the user, documents, and the like. The RAM 103 is a volatile memory. The CPU 101 loads various programs in the ROM 102 to the RAM 103 and executes these programs. The communication unit 104 is a wired local area network (LAN) module or a wireless LAN module, and is connected to a communication unit 204 of the printing apparatus 200 through a network. The operation unit 105 is a keyboard, a mouse, or a touch panel and sends the user's operations to the CPU 101. The display unit 106 displays screens on a liquid crystal display or the like.

Next, a configuration of the printing apparatus 200 will be described. The printing apparatus 200 includes a CPU 201, a ROM 202, a RAM 203, the communication unit 204, an operation unit 205, a display unit 206, a printing unit 207, and a paper feed unit 208. The CPU 201 is a central processing unit that executes programs stored in the ROM 202. The ROM 202 is a non-volatile memory that stores a control program for controlling the printing apparatus 200. The RAM 203 is a volatile memory. The CPU 201 loads various programs in the ROM 202 to the RAM 203 and executes these programs. The communication unit 204 is a wired local area network (LAN) module or a wireless LAN module, and is connected to the communication unit 104 of the terminal apparatus 100 through the network. The operation unit 205 includes a touch panel or buttons and, in response to an input on the touch panel or pressing of the buttons, sends the user's operation to the CPU 201. The display unit 206 is a display device, such as a liquid crystal display. The printing unit 207 includes an ink-jet printer head that ejects inks, an ink supply unit that supplies the inks, and the like, and forms images on a surface of paper fed from the paper feed unit 208. The paper feed unit 208 is capable of feeding cut paper and roll paper, and feeds the paper to the printing unit 207 in response to an instruction from the CPU 201.

Figure 2:
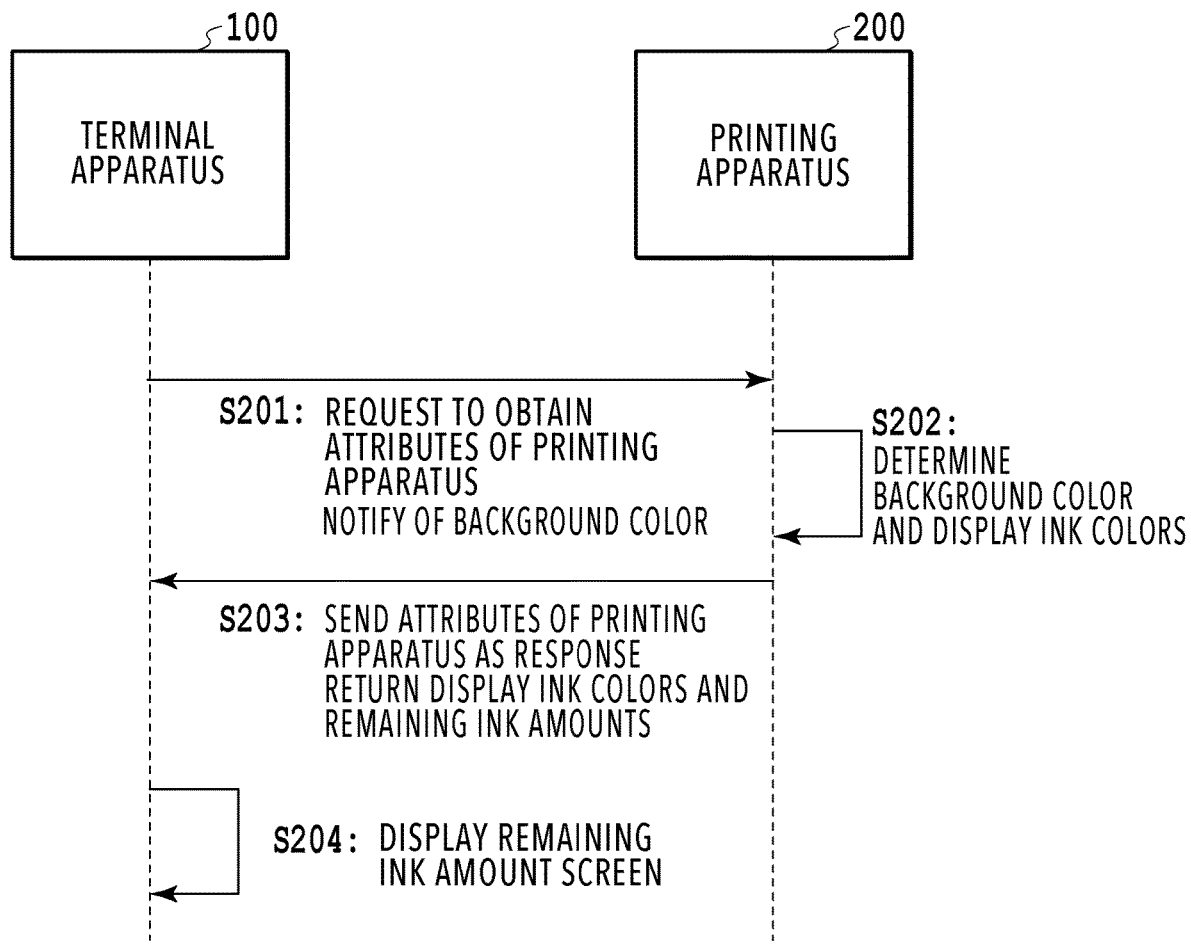
FIG. 2 is a diagram illustrating an example of a processing sequence.

FIG. 2 is a diagram illustrating an example of a processing sequence in the present embodiment. FIG. 2 illustrates an example of a processing sequence for displaying the remaining amounts of the inks in the printing apparatus 200 on the terminal apparatus 100. The process illustrated in FIG. 2 may be a process in which the terminal apparatus 100 obtains the remaining ink amounts from the printing apparatus 200 in response to receiving a trigger at a predetermined timing. The process may be part of a process in which the terminal apparatus 100 regularly obtains any information from the printing apparatus 200. The process may be part of a process performed in a case where the terminal apparatus 100 sends a print instruction to the printing apparatus 200. In any case, the process is a process performed in a case where the terminal apparatus 100 obtains attributes (information) of the printing apparatus 200 from the printing apparatus, or part of that process.

The CPU 101 performs the process of the terminal apparatus 100 illustrated in FIG. 2 by loading a program stored in the ROM 102 to the RAM 103 and executing it. The CPU 201 performs the process of the printing apparatus 200 illustrated in FIG. 2 by loading a program stored in the ROM 202 to the RAM 203 and executing it. Alternatively, the functions of some or all of the steps by the terminal apparatus 100 and the printing apparatus 200 in FIG. 2 may be implemented with hardware such as an application-specific integrated circuit (ASIC) or an electronic circuit. Meanwhile, the symbol "S" in the description of each process means a step in the sequence chart (the same applies to the subsequent sequence charts herein).

In S201, the terminal apparatus 100 requests the printing apparatus 200 to obtain attributes of the printing apparatus via the communication unit 104. In IPP, a request to obtain attributes of a printing apparatus is defined as a Get-Printer-Attributes operation, with which it is possible to request the printing apparatus to send its various attributes. In the present embodiment, simultaneously with this Get-Printer-Attributes operation, the terminal apparatus 100 further notifies the printing apparatus 200 of the background color of a display region in the terminal apparatus 100 for displaying the remaining ink amounts. In sum, in S201, the terminal apparatus 100 sends a request to obtain the attributes of the printing apparatus 200 including a notification of the background color of the remaining ink amount display region to the printing apparatus. The present embodiment will be described on the assumption that the notification of the background color is included in the request to obtain the attributes of the printing apparatus. Alternatively, the terminal apparatus 100 may individually send the notification of the background color and the request to obtain the attributes of the printing apparatus to the printing apparatus 200.

In response to receiving this obtaining request, in S202, the printing apparatus 200 performs a determination process using the background color and display ink colors. Specifically, the printing apparatus 200 performs a determination process using the background color notified of from the terminal apparatus 100, against which the remaining ink amounts are displayed on the terminal apparatus 100, and display ink colors used in the printing apparatus 200. As will be described later, the "display ink colors" used in the printing apparatus 200 are one of the attributes of the printing apparatus 200 to be returned from the printing apparatus in response to the obtaining request from the terminal apparatus 100. These "display ink colors" are used to display remaining ink amounts on the terminal apparatus 100. That is, the above "display ink colors" can be regarded as display ink colors to be used to display the remaining amounts of the inks on the terminal apparatus 100. Basically, the printing apparatus 200 is configured to notify the terminal apparatus 100 of colors similar to the real colors of the inks as the display ink colors. By displaying the colors similar to the real colors of the inks on the terminal apparatus 100, the user of the terminal apparatus 100 can quickly visually identify the individual inks and their remaining amounts. This improves convenience. Nonetheless, in a case where a display ink color is similar to the background color of the display region on the terminal apparatus for displaying the remaining ink amounts, the user may find it difficult to visually recognize the corresponding remaining ink amount. To address this, in the present embodiment, the terminal apparatus 100 sends a notification of the background color to the printing apparatus 200 in S201. In S202, the printing apparatus 200 performs a determination process using the background color notified of from the terminal apparatus 100 and the display ink colors managed in the printing apparatus 200, and performs a process of changing a display ink color(s) in a case where it is necessary to do so. Details of the determination and the ink color changing process in S202 will be described later.

Then, in S203, the printing apparatus 200 returns the attributes of the printing apparatus to the terminal apparatus 100 via the communication unit 204. The attributes thus returned include the display ink colors and the remaining ink amounts. That is, as a response to the obtaining request in S201, the printing apparatus 200 returns the attributes of the printing apparatus including the display ink colors and the remaining ink amounts to the terminal apparatus 100. Then, in S204, the terminal apparatus 100 executes display control that displays a remaining ink amount screen on the display unit 106.

FIGS. 3A and 3B are diagrams illustrating an example of the contents of IPP communication between the terminal apparatus 100 and the printing apparatus 200 used in the present embodiment. FIG. 3A illustrates the contents of a Get-Printer-Attributes operation as an example of the request to obtain the attributes of the printing apparatus 200 sent to the printing apparatus from the terminal apparatus 100 in S201. The printer-uri attribute indicates the uniform resource identifier (URL) of the printing apparatus 200, which is the sending destination. In the example of FIG. 3A, the Requested-attributes attribute is "all". Hence, all attributes of the printing apparatus 200 are requested.

Also, in FIG. 3A, the Get-Printer-Attributes operation includes a background-color attribute. The background-color attribute represents the background color to be used in the case of displaying the remaining ink amounts on the terminal apparatus 100. The background-color attribute is written as "background-color="E0E0E0"". The first two letters following "=" indicate the R value (Red). The next two letters indicate the G value (Green). The last two letters indicate the B value (Blue). The values indicated in this example are represented hexadecimally.

FIG. 3B illustrates part of the contents of the response returned to the terminal apparatus 100 from the printing apparatus 200 in S203. The media-supported attribute indicates the paper sizes supported by the printing apparatus 200. The media-type-supported attribute indicates the paper types supported by the printing apparatus 200.

The marker-colors attribute indicates the color of each ink. The marker-high-levels attribute indicates the maximum amount of each ink. The marker-levels attribute indicates the remaining amount of each ink. The marker-names attribute indicates the ink name of each ink. In FIG. 3B, the marker-colors attribute, the marker-high-levels attribute, the marker-levels attribute, and the marker-names attribute are each described in an array structure. The elements in each array are associated with the respective elements in the others. For example, in FIG. 3B, the first element of the marker-names attribute is "PM", which denotes photo magenta. The other attributes indicate that the display ink color of this photo magenta is "E0A1E2", the maximum amount of the photo magenta ink is 100, and the remaining amount of the photo magenta ink is 100. These attributes allow the terminal apparatus 100 to figure out states of the inks in the printing apparatus 200. Incidentally, in FIG. 3B, the ink names R, C, RGY, GY, Y, M, and PC denote red, cyan, photo gray, gray, yellow, magenta, and photo cyan, respectively. The printing apparatus 200 in the present embodiment uses inks of these eight colors in the above example. However, the inks loaded in the printing apparatus 200 are not limited to this example.

Figure 4:
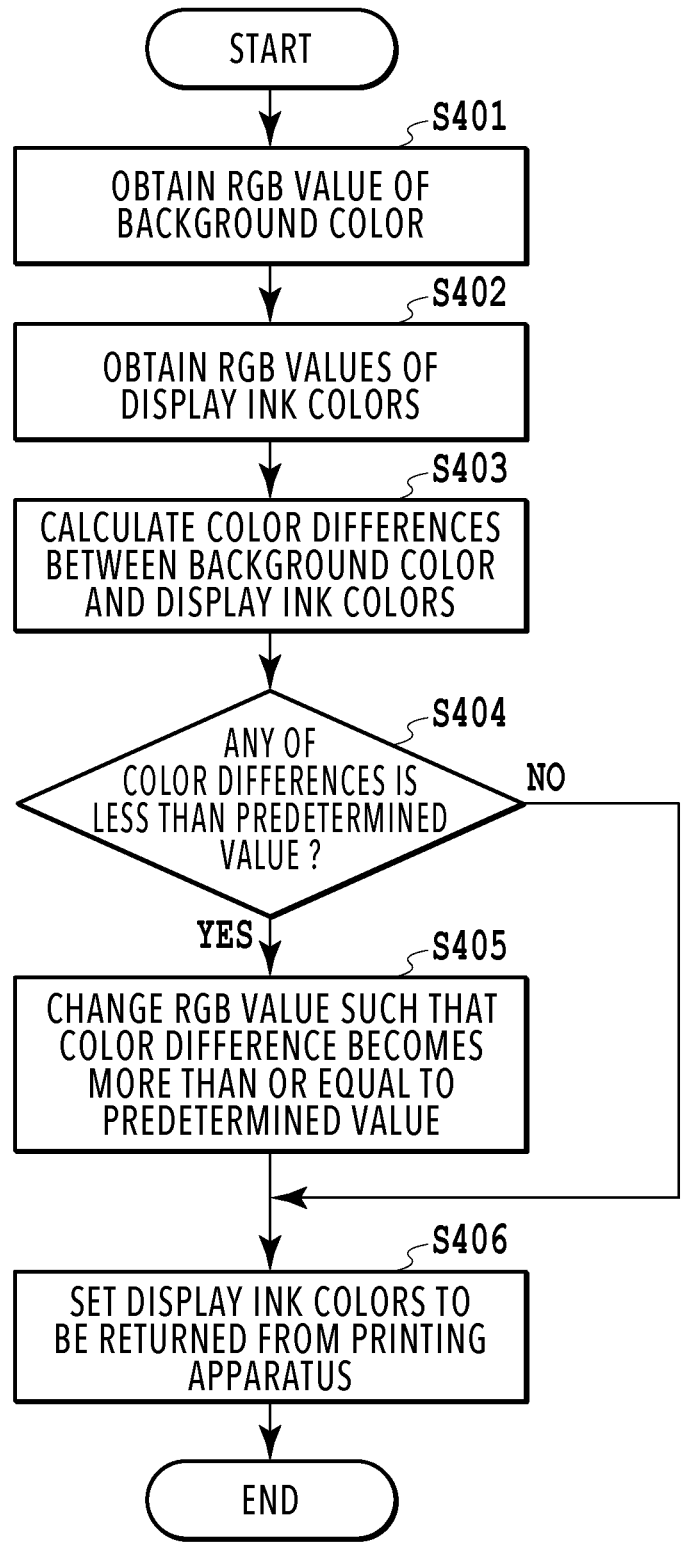
FIG. 4 is a flowchart illustrating an example of a determination process using a background color and display ink colors.

FIG. 4 is a flowchart illustrating an example of a determination process performed by the printing apparatus 200 using the background color and the display ink colors. Specifically, FIG. 4 is a flowchart illustrating details of the process in S202. In S401, the printing apparatus 200 obtains the RGB value of the background color of the remaining ink amount display screen on the terminal apparatus 100. As described above, in the present embodiment, the terminal apparatus 100 has sent the background-color attribute in the Get-Printer-Attributes operation in S201. Thus, the printing apparatus 200 obtains the value of the background-color attribute as the value of the background color against which the remaining ink amounts are displayed on the terminal apparatus 100.

Then, in S402, the printing apparatus 200 obtains the RGB values of the display ink colors of the inks accommodated in ink tanks of the printing apparatus 200. The RGB values of the display ink colors have been stored and managed in the ROM 202 or the like in advance. The printing apparatus 200 may, for example, refer to a server not illustrated or the like and store and manage the RGB values of the display ink colors in the ROM 202, the RAM 203, or the like. Alternatively, the printing apparatus 200 may be configured to refer to the server not illustrated on an as-needed basis to obtain and manage the display ink colors.

Then, in S403, the printing apparatus 200 calculates the color differences between the background color obtained in S401 and the display ink colors obtained in S402. In this example, the printing apparatus 200 calculates the color differences between the background color and the display colors of the inks in all ink tanks mounted on the printing apparatus 200. An example of the method of calculating the color differences will now be described. As indicated in the example in which a marker-colors attribute is sent to the terminal apparatus 100, color values of R (Red), G (Green), and B (Blue) are obtained as ink colors. To describe this taking cyan (C) as an example, the marker-colors attribute is written as "marker-colors="00CFFF"". The first two letters following "=" indicate the R value (Red). The next two letters indicate the G value (Green). The last two letters indicate the B value (Blue). The values indicated in this example are represented hexadecimally. That is, the display ink colors and the background color are represented in the same format. By following the above rules, the R, G, and B values of each display ink color and the R, G, and B values of the background color are obtained. Here, R1, G1, and B1 defined as the R, G, and B values of the display ink color of cyan and R2, G2, and B2 defined as the R, G, and B values of the background color are represented as below.

R1=0 (hexadecimal), 0 (decimal)

G1=CF (hexadecimal), 207 (decimal)
B1=FF (hexadecimal), 255 (decimal)
R2=E0 (hexadecimal), 224 (decimal)
G2=E0 (hexadecimal), 224 (decimal)
B2=E0 (hexadecimal), 224 (decimal)

The color difference can be calculated from Equation 1 below.

Color Difference=|R1−R2|+|G1−G2|+|B1−B2|  (Equation 1)

By inserting the decimally converted values into Equation 1, the color difference can be calculated as below.

Color Difference=|0−224|+|207−224|+|255−224|=272

The above is an example of the method of calculating the color difference between the background color and a display ink color in S403. While the above description has been given taking cyan (C) as an example, the color differences between the background color and the other display ink colors are calculated in a similar manner as well.

Then, in S404, the printing apparatus 200 determines whether any of the color differences calculated in S403 is less than a predetermined value. In the present embodiment, "100" is used as an example of the predetermined value. The processing proceeds to S405 if any of the color differences is less than the predetermined value. The processing proceeds to S406 if none of the color differences is less than the predetermined value. In S404, the color difference between the background color and each display ink color is subjected to the determination of whether it is less than the predetermined value. If there is even one display ink color with a color difference less than the predetermined value, the processing proceeds to S405. If there is no display ink color with a color difference less than the predetermined value, the processing proceeds to S406. The state where the color difference is not less than the predetermined value (i.e., the color difference is more than or equal to the predetermined value) means a state where the user can easily distinguish the background color and the display ink color from each other when looking at them. On the other hand, the state where the color difference is less than the predetermined value means a state where the user cannot easily distinguish the background color and the display ink color from each other when looking at them and therefore cannot easily visually recognize the remaining ink amount. Hence, if there is even one display ink color with a color difference less than the predetermined value, a process of changing the display ink color will be performed in S405.

In S405, the printing apparatus 200 changes the RGB value of the display ink color with a color difference less than the predetermined value. For example, the printing apparatus 200 changes the RGB value of the display ink color such that the color difference becomes more than or equal to the predetermined value. This will now be described based on an example with specific numerical values in which the predetermined value is 100, and the RGB value of the display ink color (R1, G1, B1) and the RGB value of the background color (R2, G2, B2) are the following values.

R1=208, G1=208, B1=208
R2=224, G2=224, B2=224

The color difference in this case is calculated as below.

Color Difference=|208−224|+|208−224|+|208−224|=48

Since the color difference is less than 100, the RGB value of the display ink color is changed.

First, the shortfall up to the threshold, which is 100, is calculated as below.

Shortfall=100−48=52

The shortfall is then divided by 3 in order to split and distributing the shortfall to the three R, G, and B values. As a result, the following is obtained.

52÷3=17.3333≈18

Then, the display ink color is changed by subtracting 18 from the RGB value of the display ink color (R1, G1, B1).

R1=208−18=190

G1=208−18=190

B1=208−18=190

Executing this process brings the color difference to a value which is close to 100 and is more than 100. The following is the color difference between the changed display ink color and the background color.

Color Difference=|190−224|+|190−224|+|190−224|=102

The above is an example of the process of changing the display ink color in S405. In the above-described example, in a case where the color difference is less than the predetermined value serving as a threshold, the shortfall up to the predetermined value is calculated and is divided so as to be evenly split and distributed to the three R, G and B values, and the resulting value is subtracted from each of the R, G and B values. However, the present embodiment is not limited to this example. Any configuration is possible as long as the color difference between the changed display ink color and the background color can eventually be more than or equal to the predetermined value. For instance, while subtraction is performed in the above-described example, addition may be performed instead. Also, in the above-described example, the value of the shortfall is evenly split and distributed to the three R, G, and B values, but does not necessarily have to be evenly split and distributed. Moreover, the addition or the subtraction may result in, for example, a value falling below 0 or exceeding 255, each of which is a limit value for each of the R, G, and B values. In this case, the process may be performed with the type of addition or subtraction changed. Moreover, it is possible that only changing the type of addition or subtraction may still let a value fall below the limit value of 0 or exceed the limit value of 255. In this case, the process may be performed with the below- or above-limit R, G, or B value set to 0 or 255 and with the other color values changed within the range of 0 to 255. Also, in the above-described example, the predetermined value is 100, but a value other than this may be used as long as it is a value that renders the display ink color distinguishable from the background color.

Incidentally, in a case where there are multiple display ink colors whose color differences are determined to be less than the predetermined value in S404, all of these display ink colors are changed in S405. After the process in S405 is finished, the processing proceeds to S406. In S406, the printing apparatus 200 sets the ink colors to be returned from the printing apparatus 200. The printing apparatus 200 then terminates the processing in the flowchart. That is, the printing apparatus 200 terminates the process in S202.

Figure 5:
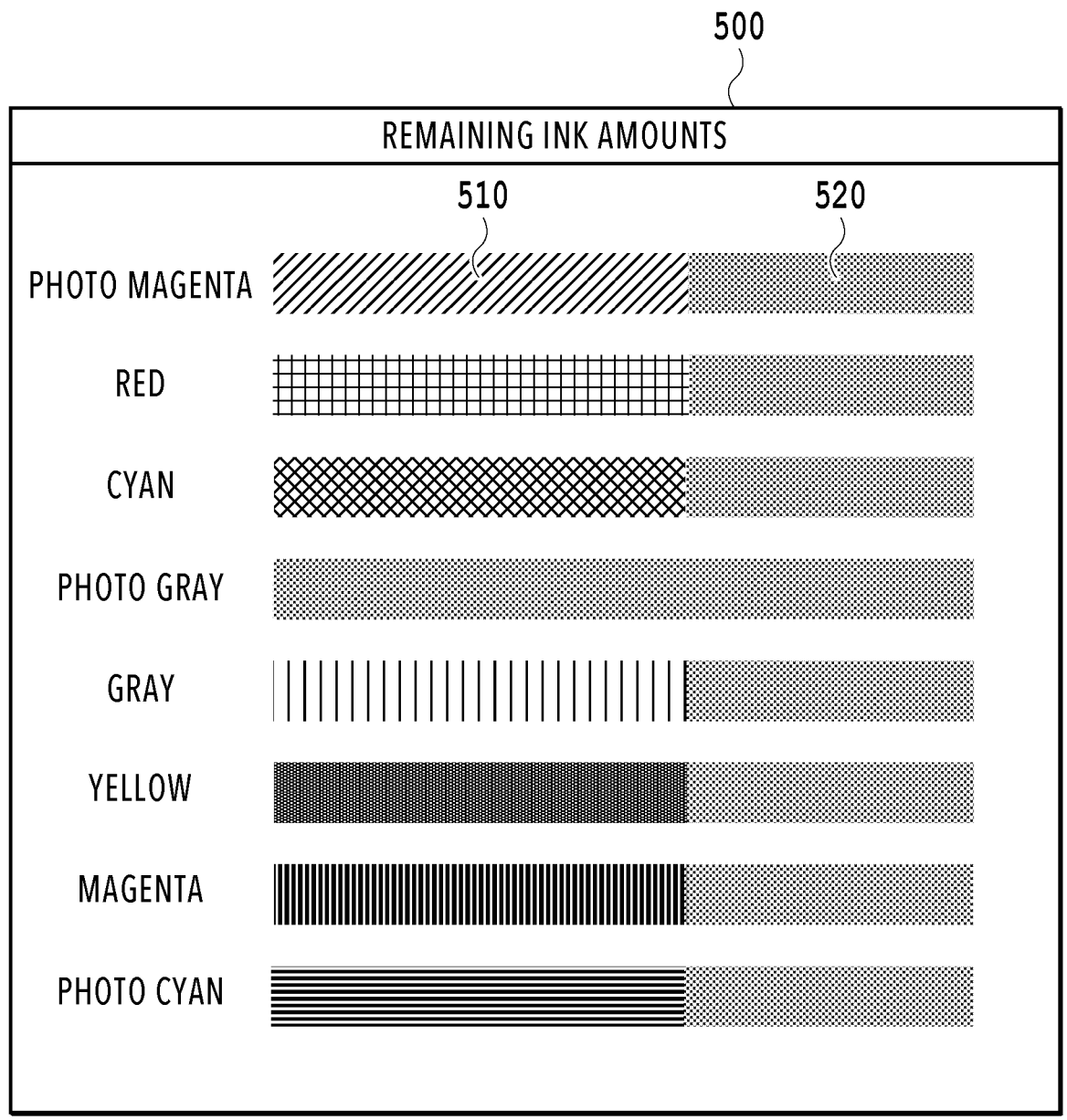
FIG. 5 is a diagram illustrating an example of a remaining ink amount display screen.

FIG. 5 is a diagram illustrating an example of a display screen 500 to be displayed on the display unit 106 in which the terminal apparatus 100 displays the remaining ink amounts by using the attributes of the printing apparatus 200 received from the printing apparatus. Remaining amount bars 510 and a background 520 are displayed in the display screen 500. An ink name label is also displayed to the left of each remaining amount bar 510. In the present embodiment, an example is illustrated in which the ink names obtained from an attribute of the printing apparatus are converted into other names and displayed on the terminal apparatus 100. Alternatively, the values designated in the marker-names attribute may be displayed as they are. The length of each remaining amount bar 510 is a length corresponding to the marker-levels attribute. The length of the background 520 corresponds to that of a region derived by subtracting the marker-levels attribute from the marker-high-levels attribute. Colors corresponding to the values designated in the marker-colors attribute are displayed as the display colors of the remaining amount bars 510. The color corresponding to the value designated in the background-color attribute, which the printing apparatus 200 has been notified of from the terminal apparatus 100, is displayed as the display color of the background 520. It is to be noted that FIG. 5 represents an example with contents different from those corresponding to the values illustrated in FIG. 3B, for the sake of simple description. It is also to be noted that the hatched patterns in FIG. 5 express an example of different color values. The display screen 500 in FIG. 5 illustrates an example in which the user cannot visually recognize the length of the remaining amount bar of photo gray since the display ink color of photo gray and the background color are similar (i.e., the color difference is less than the predetermined value).

Figure 6:
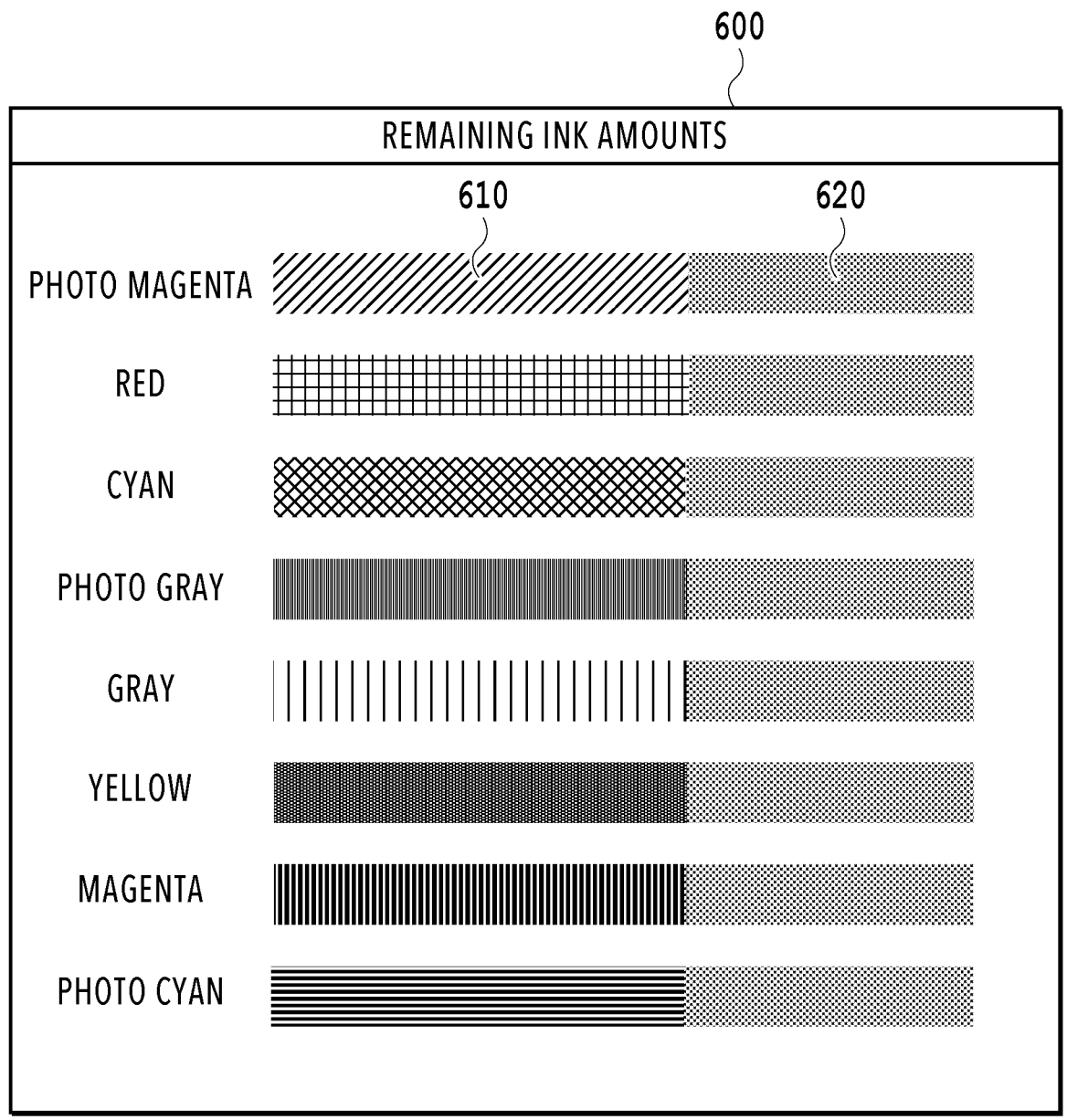
FIG. 6 is a diagram illustrating an example of a remaining ink amount display screen.

FIG. 6 is a diagram illustrating an example of a display screen 600 to be displayed on the display unit 106 in which the terminal apparatus 100 displays the remaining ink amounts by using the attributes of the printing apparatus 200 received from the printing apparatus. FIG. 6 is a diagram corresponding to FIG. 5 and, like the display screen 500, remaining amount bars 610 and a background 620 are displayed. The example of FIG. 6 illustrates a display screen 600 after changing the color of photo gray in the example illustrated in FIG. 5 by the display ink color changing process in S405 in FIG. 4. The color of the remaining amount bar 610 of photo gray in FIG. 6 is different from the color of the background 620 (the color difference is more than or equal to the predetermined value). In this state, the user can visually recognize the remaining ink amount.

As described above, according to the present embodiment, remaining ink amounts are rendered easily visually recognizable on an information processing apparatus that receives notifications from a printing apparatus. Specifically, in the present embodiment, the terminal apparatus 100, which is the information processing apparatus, sends the background color of the display region on the terminal apparatus for displaying the remaining ink amounts to the printing apparatus 200. In a case where there is an ink of a color similar to the background color (a color with a color difference less than a predetermined value), the printing apparatus 200 sends a color different from the color originally managed as the display ink color of that ink to the terminal apparatus 100. The terminal apparatus 100 uses the display ink color received from the printing apparatus 200 to display the remaining ink amount. In this way, the user can easily visually recognize the remaining ink amount. Also, since the terminal apparatus 100 in the present embodiment displays the remaining amounts by using the display ink colors notified of from the printing apparatus 200 as described above, how the ink colors are displayed on the terminal apparatus 100 can be controlled from the printing apparatus 200 side.

Second Embodiment

In the first embodiment, an example has been described in which the terminal apparatus 100 sends the background color of the display region on the terminal apparatus for displaying the remaining ink amounts to the printing apparatus 200, and the printing apparatus 200 changes a display ink color(s) based on the color difference between the background color and the display ink color(s). In a second embodiment, an example will be described in which the terminal apparatus 100 does not send the background color of the display region on the terminal apparatus for displaying the remaining ink amounts to the printing apparatus 200. Incidentally, display patterns each being a combination of a background color and a remaining amount bar color have been set in the printing apparatus 200 in advance. An example will be described in which the printing apparatus 200 sends the background color and a remaining amount bar color corresponding to a set display pattern to the terminal apparatus 100, and the terminal apparatus 100 performs a display operation based on the contents thus sent. Note that the system configuration and the apparatus configurations in the present embodiment are similar to those in the example described in the first embodiment, and description thereof is therefore omitted. The difference will be mainly described below.

Figure 7:
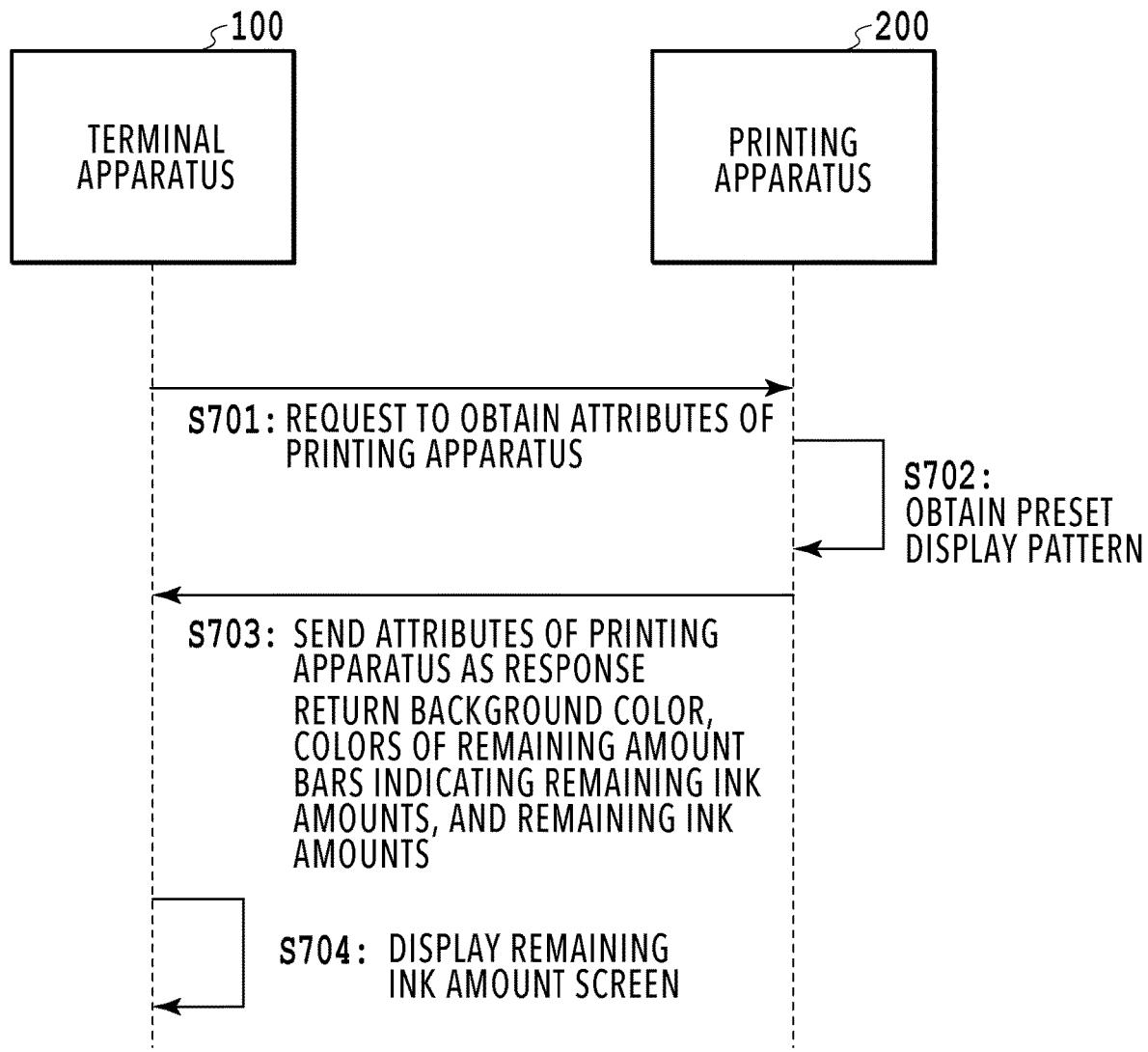
FIG. 7 is a diagram illustrating an example of a processing sequence.

FIG. 7 is a diagram illustrating an example of a processing sequence in the present embodiment. Like FIG. 2, FIG. 7 illustrates an example of a processing sequence for displaying the remaining amounts of the inks in the printing apparatus 200 on the terminal apparatus 100. The situation in which the processing in FIG. 7 is initiated is similar to the example described with reference to FIG. 2.

In S701, the terminal apparatus 100 requests the printing apparatus 200 to obtain attributes of the printing apparatus via the communication unit 104. In IPP, a request to obtain attributes of a printing apparatus is defined as a Get-Printer-Attributes operation, with which it is possible to request the printing apparatus to send its various attributes, as described in the first embodiment.

In response to receiving this obtaining request, in S702, the printing apparatus 200 obtains a preset display pattern. The display pattern is a pattern identifying a combination of a background color and a remaining amount bar color. Details of the display pattern obtaining process will be described later.

Then, in S703, the printing apparatus 200 returns the attributes of the printing apparatus to the terminal apparatus 100 via the communication unit 204. The attributes thus returned include the background color, the colors of remaining amount bars indicating the remaining ink amounts, and the remaining ink amounts. That is, as a response to the obtaining request in S701, the printing apparatus 200 returns the attributes of the printing apparatus including the background color, the colors of the remaining amount bars indicating the remaining ink amounts, and the remaining ink amounts to the terminal apparatus 100. Then, in S704, the terminal apparatus 100 displays a remaining ink amount screen on the display unit 106.

FIGS. 8A and 8B are diagrams illustrating an example of the contents of IPP communication between the terminal apparatus 100 and the printing apparatus 200 used in the present embodiment. FIG. 8A illustrates the contents of a Get-Printer-Attributes operation as an example of the request to obtain the attributes of the printing apparatus 200 sent to the printing apparatus from the terminal apparatus 100 in S701. The attributes are similar to those in the example described with reference to FIG. 3A, and description thereof is therefore omitted below. Note that the Get-Printer-Attributes operation in FIG. 8A does not include a background-color attribute as described in the first embodiment.

FIG. 8B illustrates part of the contents of the response returned to the terminal apparatus 100 from the printing apparatus 200 in S703. Description of the same attributes as the attributes already described as the contents of the response in FIG. 3B is omitted. The marker-colors attribute indicates each display ink color, as in the example described in the first embodiment. In the present embodiment, the marker-colors attribute indicates the colors of the remaining amount bars indicating the remaining amounts of the inks. In the present example illustrated, a common color is used as the display ink colors of all remaining amount bars. Moreover, in the present embodiment, a background-color attribute is included in the contents of the response to be returned to the terminal apparatus 100 from the printing apparatus 200. The background-color attribute indicates the background color of the display region on the terminal apparatus 100 for displaying the remaining ink amounts. By receiving the contents of the response in FIG. 8B, the terminal apparatus 100 can obtain the remaining amounts of the inks in the printing apparatus 200, the colors of the remaining amount bars (bar graph) indicating the remaining amounts of the inks, and the background color.

Figure 9:
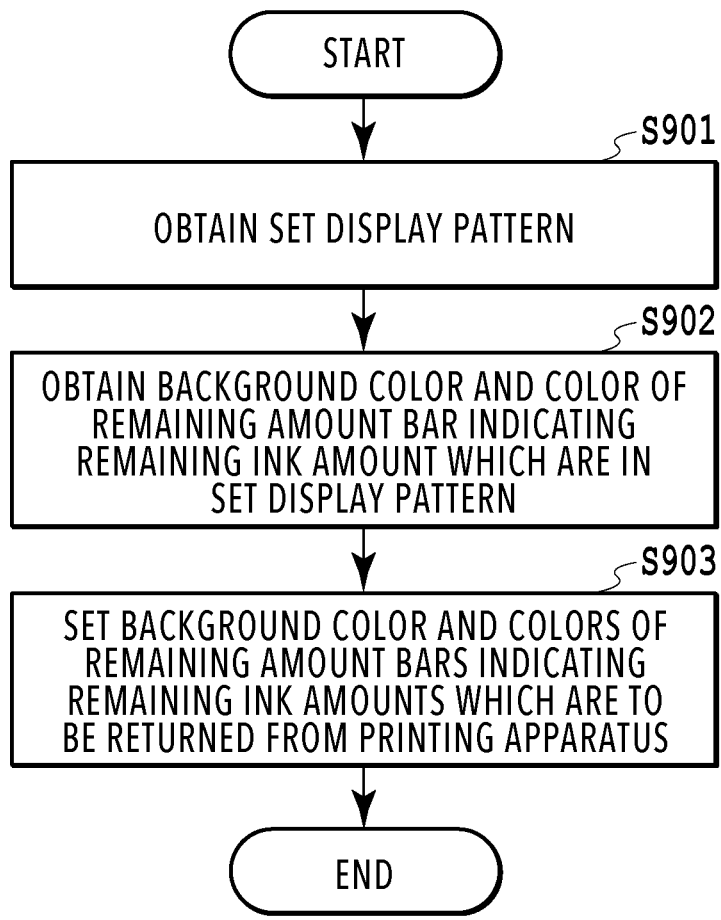
FIG. 9 is a flowchart illustrating an example of a process of obtaining a set display pattern.

FIG. 9 is a flowchart illustrating an example of a process of obtaining the set display pattern performed by the printing apparatus 200. Specifically, FIG. 9 is a flowchart illustrating details of the process in S702.

In S901, the printing apparatus 200 obtains the preset display pattern. On the printing apparatus 200, the user can set a display pattern or change a set display pattern by using the operation unit 205.

Figure 10:
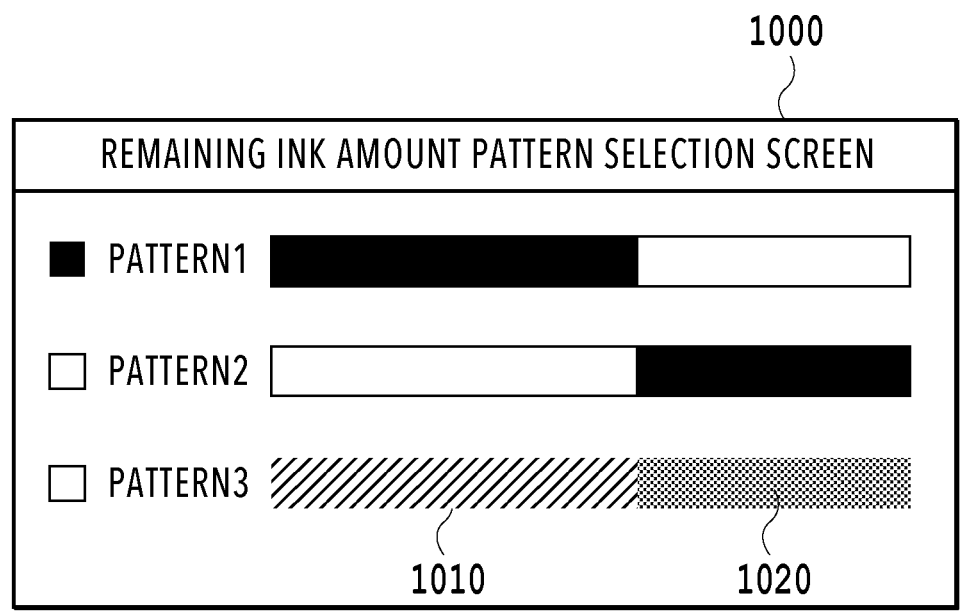
FIG. 10 is a diagram illustrating an example of a selection screen for selecting a remaining ink amount display pattern.

FIG. 10 is a diagram illustrating an example of a selection screen 1000 for selecting the display pattern of the remaining ink amounts. The selection screen 1000 is displayed on the display unit 206 of the printing apparatus 200. Each display pattern is a combination of the color of a remaining amount bar 1010 and the color of a background 1020. The selection screen in FIG. 10 illustrates an example in which three display patterns have been prepared in advance and a pattern 1 has been selected from among them. The user can select and set any one of the display patterns by using the operation unit 205 of the printing apparatus 200. The configuration may be such that the color of the remaining amount bar 1010 and the color of the background 1020 in each display pattern are changeable as appropriate. Moreover, new display patterns may be generated. Also, in the present example described, a display pattern is selected using the operation unit 205 of the printing apparatus 200, but a display pattern may be selected on the terminal apparatus 100 and the printing apparatus 200 may be notified of the selected pattern. In the setting via the selection screen 1000 in FIG. 10, the pattern 1 is selected. Accordingly, the pattern 1 is obtained as the set display pattern.

Then, in S902, the printing apparatus 200 obtains the background color and the colors of the remaining amount bars indicating the remaining amounts of the inks that are in the display pattern obtained in S901. FIG. 11 is a diagram illustrating an example of a pattern color conversion table stored in the ROM 202 of the printing apparatus 200 or the like. In the ROM 202 or the like, the printing apparatus 200 holds a table in which the values of background colors and the values of the colors of remaining amount bars indicating remaining ink amounts that correspond to the respective display patterns are associated with one another. In S902, the printing apparatus 200 refers to a table as illustrated in FIG. 11 and obtains the background color and the color of the remaining amount bar indicating a remaining ink amount that are in the display pattern obtained in S901.

Then, in S903, the printing apparatus 200 sets the background color and the colors of the remaining amount bars indicating the remaining amounts of the inks that are to be returned from the printing apparatus 200 in the background-color attribute and the marker-colors attribute, respectively. The processing in the flowchart is then terminated.

In the example illustrated FIG. 8B, the background color and the color of the remaining amount bar indicating a remaining ink amount that correspond to the pattern 1 in FIG. 11 are set as the contents of the response. As described in the first embodiment, the marker-colors attribute has a color-based array structure, and FIG. 8B illustrates an example in which the colors of the remaining amount bars indicating the remaining amounts of the inks of the eight colors in FIG. 11 are set to the same value.

A description will now be given using the display screen 500 in FIG. 5 described in the first embodiment as a comparative example of the present embodiment. The display screen 500 in FIG. 5 illustrates an example in which the user cannot visually recognize the length of the remaining amount bar of photo gray since the display ink color of photo gray and the background color are similar.

Figure 12:
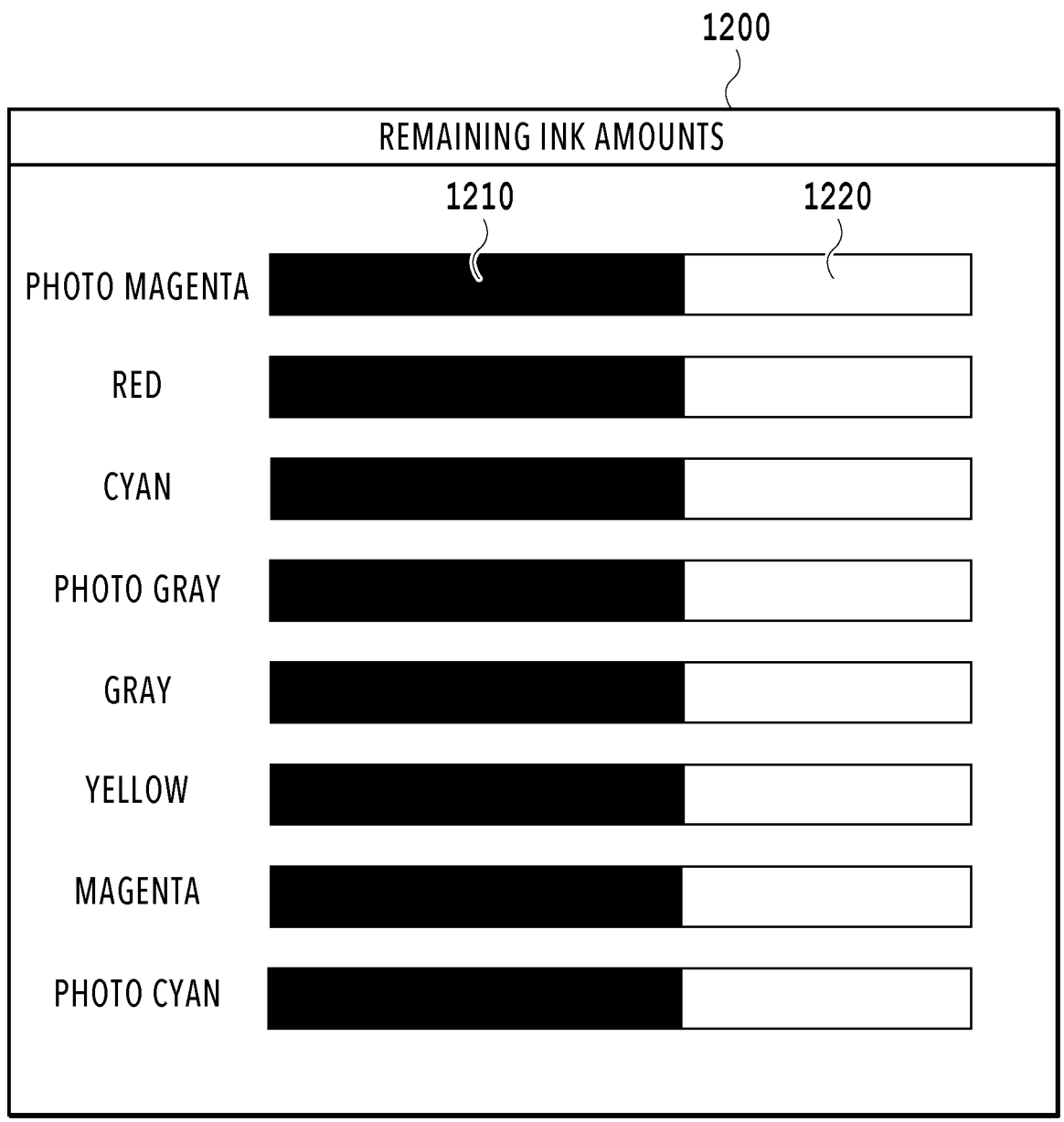
FIG. 12 is a diagram illustrating an example of a remaining ink amount display screen.

FIG. 12 is a diagram illustrating an example of a display screen 1200 to be displayed on the display unit 106 in which the terminal apparatus 100 displays the remaining ink amounts by using the attributes of the printing apparatus 200 received from the printing apparatus. FIG. 12 is a diagram corresponding to FIG. 5 and, like the display screen 500, remaining amount bars 1210 and a background 1220 are displayed. In the example of FIG. 12, the terminal apparatus 100 receives the contents of a response corresponding to the display pattern set in S702 in FIG. 7 from the printing apparatus 200, and displays the remaining amounts based on the contents of the response. Hence, the color of the remaining amount bar 1210 of every ink and the color of the background 1220 are displayed so as to be visually recognizable to the user. Accordingly, the user can easily visually recognize the remaining ink amounts.

Figure 13:
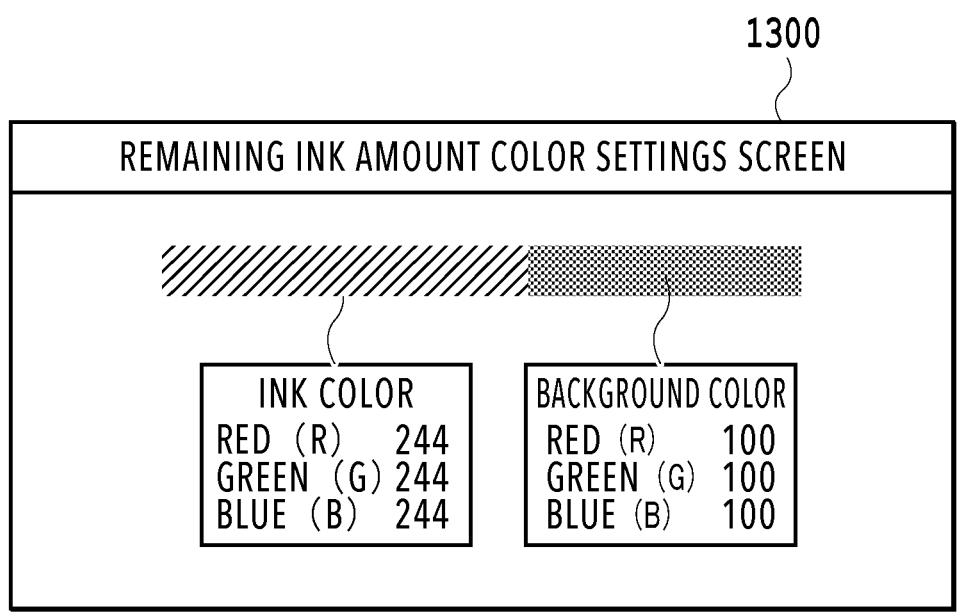
FIG. 13 is a diagram illustrating an example of settings screen on which the user sets the color values of a display pattern.

FIG. 13 is a diagram illustrating an example of a settings screen 1300 on which the user sets the color values of a display pattern. A display pattern being a combination of the color value of a remaining amount bar and the color value of a background color with such a color difference that the remaining ink amount is visually recognizable may be stored in the ROM 202 in advance and selected. Alternatively, the user may set the color values of a display pattern. That is, the configuration may be such that the user can change at least one of the color value of the remaining amount bar and the color value of the background color in a display pattern. FIG. 13 may be an example in which the user generates a new display pattern or an example in which the user changes an existing display pattern. FIG. 13 illustrates an example in which RGB values can be set as the color value of the remaining amount bar and the color value of the background color.

In a case where at least one of the color value of the remaining amount bar and the color value of the background color in a display pattern is changed or a new display pattern is created, it is preferable to perform a process of determining whether the remaining amount bar is visually recognizable. As the determination process, the process of the flowchart illustrated in FIG. 4 may be performed. In this case, the process may be performed so as to obtain the color values set in the settings screen 1300 as the display ink colors and the background color. Also, S406 may be a process of setting the color values of the display pattern set in the settings screen 1300.

In the present embodiment, an example in which a common remaining ink amount display pattern is used for all inks has been described. Alternatively, display patterns may be designated individually for the inks in all ink tanks mounted on the printing apparatus 200. In this case, the background-color attribute illustrated in FIG. 8B may be described as an array with a number of elements corresponding to the number of display ink colors, as with the marker-colors attribute and the like.

As described above, in the present embodiment too, remaining ink amounts are rendered easily visually recognizable on an information processing apparatus that receives notifications from a printing apparatus. Specifically, in the present embodiment, the terminal apparatus 100, which is the information processing apparatus, sends a request to obtain attributes including states of the ink to the printing apparatus 200, and the printing apparatus 200 in turn returns the background color and the colors of the remaining amount bars indicating the remaining amounts of the inks to the terminal apparatus 100. More specifically, the printing apparatus 200 manages therein a display pattern being a combination of a background color and a display ink color (remaining amount bar color) with a color difference that is more than or equal to a predetermined value, and notifies the terminal apparatus 100 of the contents of that display pattern. The terminal apparatus 100 displays the remaining ink amounts by using the background color and the color of the remaining amount bar indicating a remaining ink amount which are included in the contents of the response. In this way, the remaining ink amounts are easily visually recognizable on the terminal apparatus 100.

Third Embodiment

In the first embodiment, an example has been described in which the printing apparatus 200 determines the color differences, changes a display ink color(s), and sends the changed contents to the terminal apparatus 100. In the second embodiment, an example has been described in which the printing apparatus 200 sends the contents of a preset display pattern to the terminal apparatus 100. In a third embodiment, a description will be given of a configuration in which the display color of a remaining ink amount is changed in a case where the user checks a remaining ink amount display screen and determines that the remaining ink amount is difficult to visually recognize.

It is possible that the user cannot precisely visually recognize a displayed remaining ink amount depending on the type of the liquid crystal screen, screen settings, or the like of the display unit 106 of the terminal apparatus 100, for example. To address this, in the present embodiment, an update button or the like is provided in a display screen on the terminal apparatus 100 displaying the remaining ink amounts. In response to the operation unit 105 detecting pressing of the update button, the terminal apparatus 100 sends a notification of an update request to the printing apparatus 200. In response to receiving the update request, the printing apparatus 200 performs a display ink color changing process. The printing apparatus 200 then sends attributes of the printing apparatus including the changed display ink color(s) to the terminal apparatus 100. Note that the system configuration and the apparatus configurations in the present embodiment are similar to those in the example described in the first embodiment, and description thereof is therefore omitted. The difference will be mainly described below.

Figure 14:
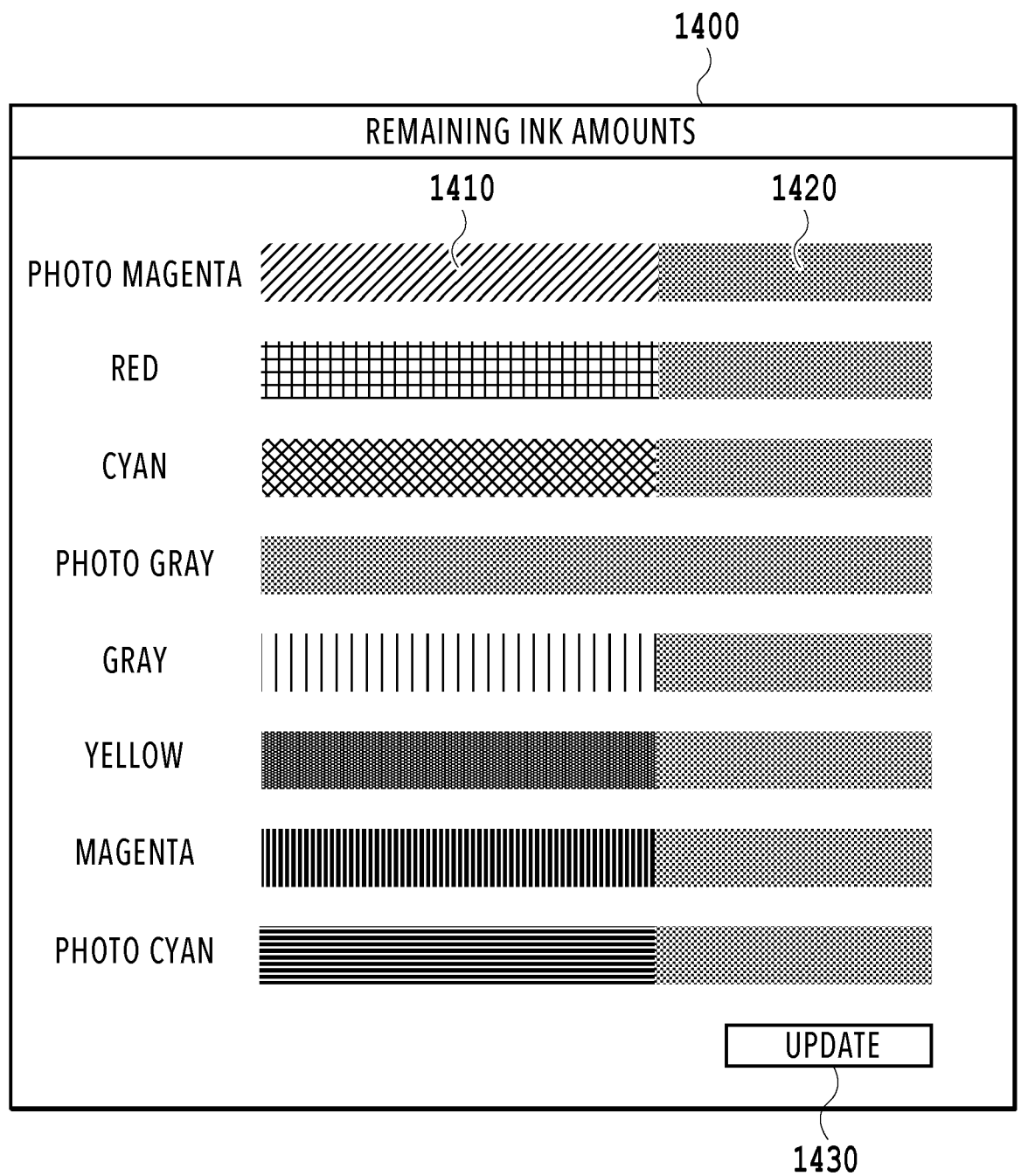
FIG. 14 is a diagram illustrating an example of a remaining ink amount display screen.

FIG. 14 is a diagram illustrating an example of a remaining ink amount display screen 1400 displayed on the display unit 106 of the terminal apparatus 100 in the present embodiment. The display screen 1400 in FIG. 14 is a screen substantially the same as FIG. 5 described as a comparative example. Specifically, remaining amount bars 1410 and a background 1420 are displayed in the display screen 1400. In the present embodiment, a process of improving the visual recognizability is not performed on the printing apparatus 200 side as described in the first and second embodiment. Moreover, FIG. 14 illustrates an example in which, in this state, the terminal apparatus 100 receives the attributes of the printing apparatus and displays the remaining ink amounts using the received attributes. Accordingly, a screen with the remaining ink amount of photo gray having poor visual recognizability is displayed, as in the example described in the first embodiment with reference to FIG. 5.

The remaining ink amount display screen 1400 in the present embodiment includes an update button 1430. In response to the user of the terminal apparatus 100 pressing the update button 1430, the terminal apparatus 100 notifies the printing apparatus 200 of a request to update information to be used to display the remaining ink amounts.

Figure 15:
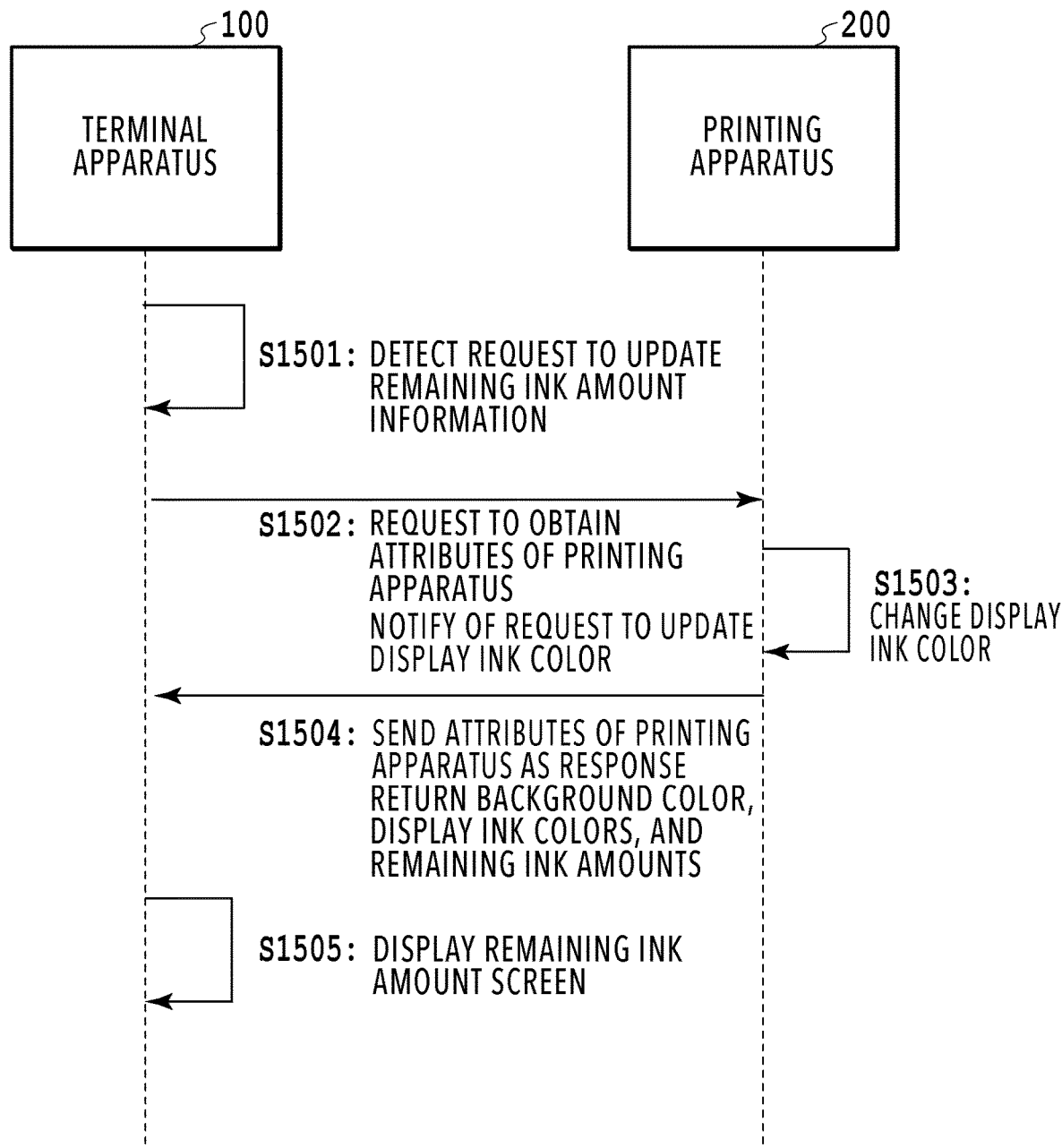
FIG. 15 is a diagram illustrating an example of a processing sequence.

FIG. 15 is a diagram illustrating an example of a processing sequence in the present embodiment. FIG. 15 is a processing sequence executed in a case where the remaining ink amount display screen 1400 illustrated in FIG. 14 is displayed. In S1501, the terminal apparatus 100 detects that the user has pressed the update button 1430 included in the remaining ink amount display screen 1400. Note that S1501 is repetitively performed until detecting the user pressing the button. In S1502, the terminal apparatus 100 requests the printing apparatus 200 to obtain attributes of the printing apparatus via the communication unit 104. In IPP, a request to obtain attributes of a printing apparatus is defined as a Get-Printer-Attributes operation, with which it is possible to request the printing apparatus to send its various attributes, as described in the first embodiment. In the present embodiment, the terminal apparatus 100 sends a request to obtain the attributes of the printing apparatus including a notification prompting update of a display ink color(s).

FIGS. 16A and 16B are diagrams illustrating an example of the contents of IPP communication between the terminal apparatus 100 and the printing apparatus 200 used in the present embodiment. FIG. 16A illustrates the contents of a Get-Printer-Attributes operation as an example of the request to obtain the attributes of the printing apparatus 200 sent to the printing apparatus from the terminal apparatus 100 in S1502. In FIG. 16A, the marker-colors-update attribute is "ON", indicating that a notification prompting update of a display ink color(s) is included. In this way, the terminal apparatus 100 can inform the printing apparatus 200 of the need to change a display ink color(s).

Then, in S1503, the printing apparatus 200 changes a display ink color(s). Details of the display ink color changing process will be described later. Then, in S1504, the printing apparatus 200 returns the attributes of the printing apparatus to the terminal apparatus 100 via the communication unit 204. The attributes thus returned include the background color, the display ink colors, and the remaining ink amounts. That is, as a response to the obtaining request in S1502, the printing apparatus 200 returns the attributes of the printing apparatus including the background color, the display ink colors, and the remaining ink amounts to the terminal apparatus 100. Then, in S1505, the terminal apparatus 100 displays a remaining ink amount screen on the display unit 106.

FIG. 16B illustrates part of the contents of the response returned to the terminal apparatus 100 from the printing apparatus 200 in S1504. In the present embodiment, a background-color attribute is included as part of the contents of the response. The other attributes are the same as those described in FIG. 3B. Using these attributes, the terminal apparatus 100 can figure out the colors of the remaining amount bars indicating the remaining amounts of the inks in the printing apparatus 200, the background color, and the remaining ink amounts.

Figure 17:
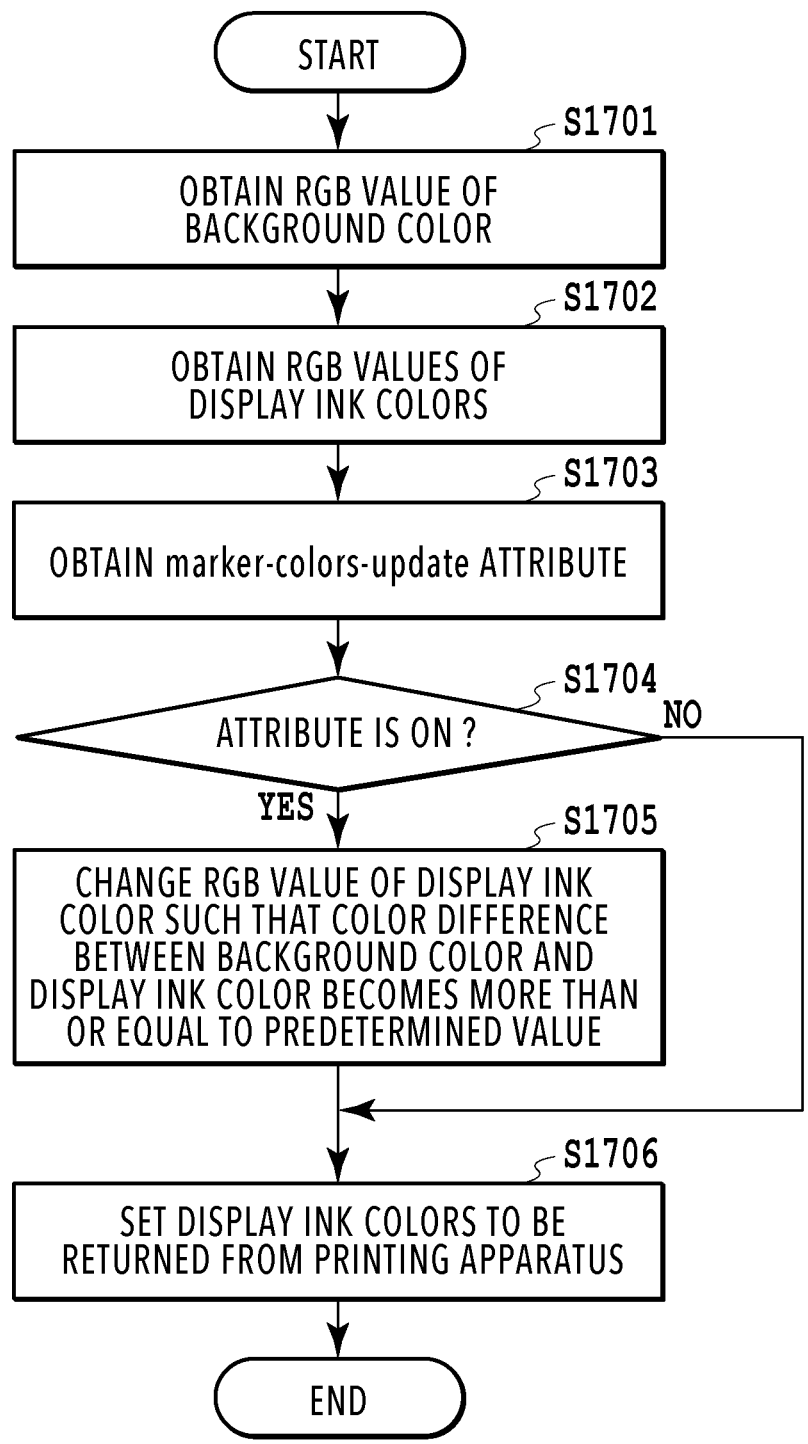
FIG. 17 is a flowchart illustrating an example of a process of changing a display ink color(s).

FIG. 17 is a flowchart illustrating an example of a display ink color changing process performed by the printing apparatus 200. Specifically, FIG. 17 is a flowchart illustrating details of the process in S1503.

In S1701, the printing apparatus 200 obtains the RGB value of the background color. In this step, the printing apparatus 200 obtains the RGB value of a background color stored in the ROM 202. Then, in S1702, the printing apparatus 200 obtains the RGB values of the display ink colors. In this step, the printing apparatus 200 obtains the RGB values of display ink colors stored in the ROM 202. Then, in S1703, the printing apparatus 200 obtains the value of the marker-colors-update attribute. Then, in S1704, the printing apparatus 200 determines whether the value of the marker-colors-update attribute obtained in S1703 is "ON". The processing proceeds to S1705 if the value is "ON", and proceeds to S1706 if the value is not "ON". In S1705, the printing apparatus 200 changes the RGB value of a display ink color(s) such that the color difference between the background color and the display ink color(s) becomes more than or equal to a predetermined value (more than or equal to 100 in the present case). The process in S1705 is performed for all inks with color differences that are not more than or equal to the predetermined value. The processing then proceeds to S1706. In S1706, the printing apparatus 200 sets the ink colors to be returned from the printing apparatus 200. The printing apparatus 200 then terminates the processing in the flowchart. That is, the printing apparatus 200 terminates the process in S1503.

In the process in FIG. 17, the "predetermined value" used in S1705 may be updated to a different value each time the process in FIG. 17 is performed. It is possible that the user has pressed the update button 1430 and a display ink color has been changed but the user still finds it difficult to visually recognize the display ink color and presses the update button 1430 again. In this case, the next display ink color changing process can be performed with the predetermined value set to a different value (e.g., 120). Also, the third or later process is preferably performed, for example, by using a predetermined value which has not been used in the process so far (e.g., 140) to avoid the same display ink color. In sum, in a case of repetitively receiving an update request, it is preferable to the display color of an ink which has been changed from a previous display color to a display color different from the previous display color.

In the present embodiment, an example has been described in which the printing apparatus 200 sends the background color of the display region for displaying the remaining ink amounts to the terminal apparatus 100. However, the present embodiment is not limited to this example. The terminal apparatus 100 may notify the printing apparatus 200 of the background color of the display region on the terminal apparatus for displaying the remaining ink amounts as described in the first embodiment when sending a notification of update of a display ink color(s). Also, in the present embodiment, an example has been described in which the printing apparatus 200 returns the display ink color of each ink to the terminal apparatus 100 as described in the first embodiment. However, the present embodiment is not limited to this example. A process as described in the second embodiment may be performed in a case where the update button 1430 is pressed. That is, the configuration may be such that the printing apparatus 200 returns a preset display pattern to the terminal apparatus 100. Also, the configuration may be such that the present embodiment is implemented after finishing the process in the first or second embodiment. Specifically, the process of updating a display ink color(s) or the like may be performed in a case where the user desires update even after the printing apparatus 200 sends the terminal apparatus 100 the display ink colors or the like whose visual recognizability has been checked by the printing apparatus 200.

As described above, according to the present embodiment, a process of changing the color of a remaining ink amount to a visually recognizable color is performed in a case where it is difficult for the user to visually recognize the remaining ink amount. This improves the visual recognizability of the remaining ink amount to the user.

Other Embodiments

In the embodiments described above, an example has been described in which the terminal apparatus 100 and the printing apparatus 200 are connected through a network by using a wired LAN module or a wireless LAN module. However, the embodiments are not limited to this example. The terminal apparatus 100 and the printing apparatus 200 may communicate with each other by the Universal Serial Bus (USB) or the like, for example. Also, in the embodiments described above, display ink colors have been described as an example of the display colors of color materials. However, the color materials are not limited to inks. For example, the printing apparatus 200 may be a laser printer or the like instead of an ink-jet printer. Specifically, the configuration may be such that the remaining ink amounts as the remaining amounts of the color materials described in the above embodiments are replaced with and read as remaining toner amounts, and the display ink colors as the display colors of the color materials are replaced with and read as display toner colors.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-133300, filed Aug. 24, 2022, which is hereby incorporated by reference in its entirety.

What is claimed is:

1. A printing apparatus capable of communicating with an information processing apparatus which displays a remaining amount of a first color material and a second color material in the printing apparatus on a display region based on information sent from the printing apparatus, the printing apparatus comprising at least one memory and at least one processor which function as:
   a reception unit configured to receive an obtaining request to obtain information on the printing apparatus from the information processing apparatus, the information including a first color material display color;
   a control unit configured to modify the first color material display color such that a color difference between the first color material display color and a background color of the display region becomes more than or equal to a predetermined value; and
   a sending unit configured to send information on the printing apparatus including the modified first color material display color and the remaining amount of the first color material to the information processing apparatus as a response to the obtaining request, wherein
   the reception unit receives the obtaining request including a request to update a second color material display color,
   the control unit modifies the updated second color material display color managed in the printing apparatus such that the modified display color difference between the second color material display color and the background color becomes more than or equal to the predetermined value, and
   the sending unit sends information on the printing apparatus including the modified display color of the second color material to the information processing apparatus,
   wherein the information processing apparatus displays the remaining amount of the first and second color materials in the display region using the modified first and second color material display colors and the background color.

2. The printing apparatus according to claim 1, wherein
   the reception unit receives the obtaining request including information on the background color of the display region,
   the control unit changes a display color of the first color material managed in the printing apparatus whose color difference from the received background color is less than the predetermined value such that the color difference becomes more than or equal to the predetermined value, and
   the sending unit sends information on the printing apparatus including the changed display color to the information processing apparatus.

3. The printing apparatus according to claim 2, wherein the control unit does not change the first color material display color managed in the printing apparatus whose color difference from the received background color is less than the predetermined value.

4. The printing apparatus according to claim 1, wherein
   the at least one memory and the at least one processor further function as an obtaining unit configured to obtain a display pattern being a combination of a background color and a display color of a color material in response to the obtaining request,
   the control unit sets the background color and the display color corresponding to the obtained display pattern as a response to the obtaining request, and
   the sending unit sends information on the printing apparatus including the set background color and display color to the information processing apparatus.

5. The printing apparatus according to claim 4, wherein a color difference between the background color and the display color in the display pattern is more than or equal to the predetermined value.

6. The printing apparatus according to claim 4, wherein the display pattern is a common pattern for all color materials in the printing apparatus.

7. The printing apparatus according to claim 4, wherein
   the printing apparatus manages a plurality of the display patterns, and
   the obtaining unit obtains a display pattern selected by a user from among the plurality of display patterns.

8. The printing apparatus according to claim 4, wherein at least one of the background color and the first color material display color in the display pattern is changeable by a user.

9. The printing apparatus according to claim 8, wherein in a case where a user changes at least one of the background color and the first color material display color in the display pattern, the control unit controls a color difference between the background color and the first color material display color after the change such that the color difference is more than or equal to the predetermined value.

10. The printing apparatus according to claim 1, wherein
    the background color is a color managed in the printing apparatus, and
    the sending unit sends information on the printing apparatus including the background color to the information processing apparatus.

11. The printing apparatus according to claim 1, wherein
    the reception unit receives the obtaining request further including information on the background color of the display region,
    the control unit changes the first color material display color managed in the printing apparatus such that a color difference between the display color of the first color material and the received background color becomes more than or equal to the predetermined value.

12. The printing apparatus according to claim 1, wherein in a case of repetitively receiving the update request, the control unit changes the first color material display color which has been changed from a previous display color to a display color different from the previous display color.

13. An information processing apparatus which is capable of communicating with a printing apparatus and displays a remaining amount of a first color material and a second color material in the printing apparatus on a display region based on information sent from the printing apparatus, the information processing apparatus comprising at least one memory and at least one processor which function as:
- a sending unit configured to send a request to obtain information on the printing apparatus to the printing apparatus, the information including a first color material display color;
- a reception unit configured to receive information on the printing apparatus including the first color material display color and the remaining amount of the color material as a response to the obtaining request, the first color material display color being modified by the printing apparatus such that a color difference between the first color material display color and a background color of the display region becomes more than or equal to a predetermined value; and
- a display control unit configured to display the remaining amount of the first color material on a display unit by using the received first color material display color, wherein
- the reception unit receives the obtaining request including a request to update a second color material display color,
- the updated second color material display color managed in the printing apparatus is modified such that the modified display color difference between the second color material display color and the background color becomes more than or equal to the predetermined value, and
- the sending unit sends information on the printing apparatus including the modified second color material display color to the information processing apparatus,
- wherein the display control unit displays the remaining amount of the first and second color materials in the display region using the modified first and second color material display colors and the background color.

14. The information processing apparatus according to claim 13, wherein
- the sending unit sends the obtaining request including information on the background color of the display region, and
- the reception unit receives, from the printing apparatus, information on the printing apparatus including the first color material display color in the printing apparatus which has been changed by the printing apparatus from the first color material display color whose color difference from the background color is less than a predetermined value such that the color difference becomes more than or equal to the predetermined value.

15. The information processing apparatus according to claim 13, wherein
- the reception unit receives the information on the printing apparatus further including the background color of the display region from the printing apparatus, and
- the display control unit displays the remaining amount of the color material in the printing apparatus by using the background color received by the reception unit.

16. The information processing apparatus according to claim 13, wherein
- the display control unit is configured to be capable of receiving an instruction to update the first color material display color in a case of displaying the remaining amount in the display region, and
- the sending unit sends the obtaining request including a request to update the first color material display color in response to the instruction.

17. A printing system comprising:
- an information processing apparatus configured to display a remaining amount of a first color material and a second color material in a printing apparatus in a display region based on information sent from the printing apparatus; and
- the printing apparatus capable of communicating with the information processing apparatus, wherein
- the printing apparatus comprises at least one memory and at least one processor which function as:
- a reception unit configured to receive an obtaining request to obtain information on the printing apparatus from the information processing apparatus, the information including a first color material display color;
- a control unit configured to modify the first color material display color such that a color difference between the first color material display color and a background color of the display region becomes more than or equal to a predetermined value; and
- a sending unit configured to send information on the printing apparatus including the modified first color material display color and the remaining amount of the first color material to the information processing apparatus as a response to the obtaining request, wherein
- the reception unit receives the obtaining request including a request to update a second color material display color,
- the control unit modifies the updated second color material display color managed in the printing apparatus such that the modified display color difference between the second color material display color and the background color becomes more than or equal to the predetermined value, and
- the sending unit sends information on the printing apparatus including the modified second color material display color to the information processing apparatus,
- wherein the information processing apparatus displays the remaining amount of the first and second color materials in the display region using the modified first and second color material display colors and the background color,
- the information processing apparatus comprises at least one memory and at least one processor which functions as:
- a second sending unit configured to send a request to obtain the information on the printing apparatus to the printing apparatus, the information including the first color material display color;
- a second reception unit configured to receive the information on the printing apparatus including the first color material display color and the remaining amount of the color material as a response to the obtaining request, the first color material display color being modified by the printing apparatus such that a color difference between the first color material display color and a background color of the display region becomes more than or equal to a predetermined value; and
- a display control unit configured to display the remaining amount of the first color material on a display unit by using the received first color material display color, wherein
- the second reception unit receives the obtaining request including a request to update a second color material display color,
- the updated second color material display color managed in the printing apparatus is modified such that the modified display color difference between the second color material display color and the background color becomes more than or equal to the predetermined value, and the second sending unit sends information on the printing apparatus including the modified second color material display color to the information processing apparatus, wherein the display control unit displays the remaining amount of the first and second color materials in the display region using the modified first and second color material display colors and the background color.

18. A method of controlling a printing apparatus capable of communicating with an information processing apparatus which displays a remaining amount of a first color material and a second color material in the printing apparatus on a display region based on information sent from the printing apparatus, the method comprising:

receiving an obtaining request to obtain information on the printing apparatus from the information processing apparatus, the information including a first color material display color;

modifying the first color material display color such that a color difference between the first color material display color and a background color of the display region becomes more than or equal to a predetermined value; and sending information on the printing apparatus including the modified first color material display color and the remaining amount of the first color material to the information processing apparatus as a response to the obtaining request, wherein the obtaining request including a request to update a second color material display color is received, the updated second color material display color managed in the printing apparatus is modified such that the modified display color difference between the second color material display color and the background color becomes more than or equal to the predetermined value, and information on the printing apparatus including the modified second color material display color is sent to the information processing apparatus, wherein the information processing apparatus displays the remaining amount of the first and second color materials in the display region using the modified first and second color material display colors and the background color.

19. A method of controlling an information processing apparatus which is capable of communicating with a printing apparatus and displays a remaining amount of a first color material and a second color material in the printing apparatus on a display region based on information sent from the printing apparatus, the method comprising:

sending an obtaining request to obtain information on the printing apparatus to the printing apparatus, the information including a first color material display color;

receiving information on the printing apparatus including the first color material display color and the remaining amount of the color material as a response to the obtaining request, the first color material display color being modified by the printing apparatus such that a color difference between the first color material display color and a background color of the display region becomes more than or equal to a predetermined value; and displaying the remaining amount of the color material on a display unit by using the received first color material display color, wherein the obtaining request including a request to update a second color material is received, the updated second color material display color managed in the printing apparatus is modified such that the modified display color difference between the second color material display color and the background color becomes more than or equal to the predetermined value, and information on the printing apparatus including the modified second color material display color is sent to the information processing apparatus, wherein the remaining amount of the first and second color materials is displayed in the display region using the modified first and second color material display colors and the background color.

20. A non-transitory computer readable storage medium storing a program which causes a computer to execute: a method of controlling a printing apparatus capable of communicating with an information processing apparatus which displays a remaining amount of a first color material and a second color material in the printing apparatus on a display region based on information sent from the printing apparatus, the method comprising:

receiving an obtaining request to obtain information on the printing apparatus from the information processing apparatus, the information including a first color material display color;

modifying the first color material display color such that a color difference between the first color material display color and a background color of the display region becomes more than or equal to a predetermined value; and sending information on the printing apparatus including the modified first color material display color and the remaining amount of the first color material to the information processing apparatus as a response to the obtaining request, wherein the obtaining request including a request to update a second color material display color is received, the updated display color of the second color material managed in the printing apparatus is modified such that the modified display color difference between the second color material display color and the background color becomes more than or equal to the predetermined value, and information on the printing apparatus including the modified second color material display color is sent to the information processing apparatus, wherein the information processing apparatus displays the remaining amount of the first and second color materials in the display region using the modified first and second color material display colors and the background color.

21. A non-transitory computer readable storage medium storing a program which causes a computer to execute a method of controlling an information processing apparatus which is capable of communicating with a printing apparatus and displays a remaining amount of a first color material and a second color material in the printing apparatus on a display region based on information sent from the printing apparatus, the method comprising:

sending an obtaining request to obtain information on the printing apparatus to the printing apparatus, the information including a first color display material;

receiving information on the printing apparatus including the first color material display color and the remaining amount of the color material as a response to the obtaining request, the first color material display color being modified by the printing apparatus such that a color difference between the first color material display color and a background color of the display region becomes more than or equal to a predetermined value; and displaying the remaining amount of the color material on a display unit by using the received first color material display color, wherein the obtaining request including a request to update a second color material display color is received, the updated second color material display color managed in the printing apparatus is modified such that the modified display color difference between the second color material display color and the background color becomes more than or equal to the predetermined value, and information on the printing apparatus including the modified second color material display color is sent to the information processing apparatus, wherein the remaining amount of the first and second color materials is displayed in the display region using the modified first and second color material display colors and the background color.

\* \* \* \* \*